(12) United States Patent
Kanaya et al.

(10) Patent No.: US 8,083,216 B2
(45) Date of Patent: Dec. 27, 2011

(54) VIBRATION DAMPING DEVICE EQUIPPED WITH RUBBER HEAT-INSULATING COVER

(75) Inventors: Tomohiro Kanaya, Kasugai (JP); Kei Okumura, Kakamigahara (JP)

(73) Assignee: Tokai Rubber Industries, Ltd., Komaki (JP)

( * ) Notice: Subject to any disclaimer, the term of this patent is extended or adjusted under 35 U.S.C. 154(b) by 792 days.

(21) Appl. No.: 12/216,880

(22) Filed: Jul. 11, 2008

(65) Prior Publication Data
US 2009/0026675 A1    Jan. 29, 2009

(30) Foreign Application Priority Data
Jul. 13, 2007   (JP) ................. 2007-184971

(51) Int. Cl.
*F16F 5/00*       (2006.01)
*F16M 1/00*       (2006.01)
(52) U.S. Cl. ................. 267/140.13; 267/141.3
(58) Field of Classification Search ............ 267/140.13, 267/140.14, 136, 140.4, 141.3, 141.7; 248/560, 248/573, 638
See application file for complete search history.

(56) References Cited

U.S. PATENT DOCUMENTS

| | | | | |
|---|---|---|---|---|
| 2,162,714 A * | 6/1939 | Hamblin | ............... | 267/141.1 |
| 6,550,753 B2 | 4/2003 | Takashima et al. | | |
| 6,932,332 B2 * | 8/2005 | Thomazeau | ............... | 267/140.13 |
| 7,055,811 B2 * | 6/2006 | Ihara et al. | ............... | 267/140.13 |
| 2002/0140144 A1 * | 10/2002 | Hibi et al. | ............... | 267/140.13 |
| 2004/0021259 A1 * | 2/2004 | Visage et al. | ............ | 267/140.13 |
| 2006/0043656 A1 * | 3/2006 | Shimizu | .................. | 267/140.11 |
| 2006/0157633 A1 * | 7/2006 | Bellamy et al. | ............. | 248/562 |
| 2007/0013116 A1 * | 1/2007 | Nemoto et al. | .......... | 267/140.14 |
| 2009/0026672 A1 * | 1/2009 | Okumura et al. | ............ | 267/136 |

FOREIGN PATENT DOCUMENTS

| | | | |
|---|---|---|---|
| JP | U-5-71491 | | 9/1993 |
| JP | 8233010 A | * | 9/1996 |
| JP | 8296681 A | * | 12/1996 |
| JP | A-2000-057664 | | 9/2000 |
| JP | A-2003-056636 | | 2/2003 |
| JP | A-2004-276764 | | 10/2004 |
| JP | A-2005-172202 | | 6/2005 |

* cited by examiner

*Primary Examiner* — Melody Burch
(74) *Attorney, Agent, or Firm* — Oliff & Berridge, PLC

(57) ABSTRACT

A vibration damping device having a rubber heat-insulating cover wherein a strike plate portion and a pair of leg portions of a stopper member have detaining slots opening towards an outside, and two side walls of the detaining slot of the strike plate portion has stepped portions of notched shape disposed in its heightwise distal edge section. Center hook portions are formed on an outside face of a center section of the rubber heat-insulating cover, while outside hook portions are formed on an outside face of a peripheral wall portion of the rubber heat-insulating cover. The center hook portions are engaged with the two side walls of the detaining slot, and the outside hook portions are engaged with the two side walls of the detaining slots in the leg portions. Two end faces of the center hook portions are held in abutment against stepped faces at either end of the stepped portions in both side walls of the detaining slot.

3 Claims, 10 Drawing Sheets

US 8,083,216 B2

VIBRATION DAMPING DEVICE EQUIPPED WITH RUBBER HEAT-INSULATING COVER

INCORPORATED BY REFERENCE

The disclosure of Japanese Patent Application No. 2007-184971 filed on Jul. 13, 2007 including the specification, drawings and abstract is incorporated herein by reference in its entirety.

BACKGROUND OF THE INVENTION

1. Field of the Invention

The present invention relates to a vibration damping device including: a first mounting member fixable to a first component for vibration damped connection; a second mounting member fixable to another component; and a main rubber elastic body elastically connecting the first and second mounting members. More specifically, the present invention is concerned with a vibration damping device with a rubber heat-insulating cover, which is novel in structure having a rebound stopper mechanism for limiting an amount of displacement of the first mounting member and the second mounting member in the direction of mutual separation, as well as a rubber heat-insulating cover for protecting the main rubber elastic body from the effects of heat.

2. Description of the Related Art

Among vibration damping devices such as vibration damping connections and vibration damping supports adapted for interposition between components that make up a vibration transmission system, one type of device proposed in the past has a structure which includes a first mounting member fixable to a component intended for vibration damped connection, and a second mounting member fixable to another component, which members are elastically connected by a main rubber elastic body. Application of vibration damping devices having this structure as automotive engine mounts, body mounts, or suspension bushings for example, is the subject of ongoing research.

In order to exhibit good vibration isolating action, a vibration damping device is desired to have sufficiently soft spring characteristics. On the other hand, upon input of large vibrational load, the vibration damping device is required to prevent large displacement of one component and the other component which are connected in a vibration damping fashion. Consequently, in vibration damping devices, the first mounting member and the second mounting member are provided typically with a stopper mechanism designed to limit the amount of their relative displacement.

JP-A-2005-172202 disclose one example of such stopper mechanisms in the form of a rebound type stopper mechanism that includes an arched stopper member fastened at both of its leg sections to the second mounting member so as to straddle the first mounting member in the axis-perpendicular direction, with the center section of the stopper member positioned in opposition in the axial direction to the first mounting member. With this design, in the event that the first mounting member and the second mounting member experience appreciable displacement in the direction of mutual separation (rebound direction) due to input of a large load, the amount of displacement of the first and second mounting members in the rebound direction will be limited by the stopper member striking the first mounting member.

Incidentally, vibration damping devices furnished with a stopper mechanism of the sort described above are frequently employed in automotive engine mounts or other systems where they are exposed to input of large-amplitude vibration for example. A resultant problem is that if the main rubber elastic body is exposed directly to radiant heat or heat gases from an engine, durability may decline to the point that it becomes difficult to obtain sufficient vibration damping action based on resilience of the main rubber elastic body.

One known measure for addressing this problem is a heat-insulating cover-equipped vibration damping device having a heat-insulating cover (heat-insulating panel) disposed spacedly covering the outside surface of the main rubber elastic body so as to reduce the effects of outside heat on the main rubber elastic body. Such a device is taught in JP-A-2004-276764 for example.

However, the vibration damping device shown in JP-A-2004-276764 has the inherent drawback that, because of a structure whereby the center section of the heat-insulating cover is supported on the first mounting member through the space between the main rubber elastic body and the stopper member, and the outside peripheral portion of the heat-insulating cover is supported on the same bracket on the second mounting member side as that to which the outside peripheral portion of the stopper member is fastened. Thus, the assembly operation to fasten the heat-insulating cover to the vibration damping device main unit is complicated, making it difficult to achieve any reduction in the number of assembly steps, and a resultant inability to improve production efficiency.

SUMMARY OF THE INVENTION

It is an object of the present invention to provide a vibration damping device equipped with a stopper mechanism having a novel construction which enables the rubber heat-insulating cover to be installed quickly and reliably in the vibration damping device main unit, and which consistently affords the desired heat insulation action as well as advantageously improving production efficiency.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

One aspect of the present invention provides a vibration damping device having a rubber heat-insulating cover including: a first mounting member fixable to one of components connected together in a vibration damping fashion; a second mounting member fixable to an other of the components; a main rubber elastic body elastically connecting the first and second mounting members; a stopper member of arched shape which includes a pair of leg portions at either end of a strike plate portion extending in an axis-perpendicular direction, the stopper member being attached with lower ends of the pair of leg portions fastened to the second mounting member so as to project outward from the first mounting member in order to effect relative positioning of the strike plate portion and the first mounting member so that the strike plate portion and the first mounting member are brought into abutting contact with each other to provide a rebound stopper mechanism for limiting an amount of displacement of the first mounting member and the second mounting member in a direction of mutual separation; and a rubber heat-insulating cover for spacedly covering an outside face of the main rubber elastic body, disposed overlying the main rubber elastic body from a first mounting member side, wherein the strike plate portion and the pair of leg portions of the stopper member are formed with detaining slots respectively opening towards an outside, and two side walls of the detaining slot of the strike plate portion have stepped portions of notched shape disposed in a heightwise distal edge section thereof, wherein center hook portions are integrally formed on an outside face of a center section of the rubber heat-insulating cover, while outside hook portions are integrally formed on an outside face of a peripheral wall portion of the rubber heat-insulating cover, and wherein the center hook portions are held in engagement with the two side walls of the detaining slot in the strike plate portion, and the outside hook portions are held in engagement with the two side walls of the detaining slots in the pair of leg portions, while two end faces of the center hook portions are held in abutment against stepped faces at either end of the stepped portions provided in both side walls of the detaining slot in the strike plate portion, for thereby positioning the center section of the rubber heat-insulating cover in a lengthwise direction of the detaining slot with respect to the strike plate portion of the stopper member, and fastening the rubber heat-insulating cover to the stopper member.

In vibration damping device having the rubber heat-insulating cover, which is of structure according to the present invention, the center hook portions of the rubber heat-insulating cover are held in engagement with the two side walls of the detaining slot in the strike plate portion, whereby the center section of the rubber heat-insulating cover is supported on the center section of the arched stopper member where the strike plate portion is disposed. Additionally, the outside hook portions of the rubber heat-insulating cover are held in engagement with the two side walls of the detaining slot in each of the leg portions, so that the peripheral wall portion of the rubber heat-insulating cover is supported by the outside peripheral section of the stopper where the leg portions are disposed. The rubber heat-insulating cover is thereby fastened, via the stopper member, to the vibration damping device main unit in which the first and second mounting members are elastically linked by the main rubber elastic body.

Since the stopper member and the rubber heat-insulating cover are formed as separate components, it will be possible to avoid any appreciable mutual interference of the stopper member and the rubber heat-insulating cover in terms of freedom of design of their shape, size, and placement. As a result, the rubber heat-insulating cover design can be modified advantageously according to the required heat insulating capability.

Additionally, since the center hook portions and the outside hook portions are integrally formed with the rubber heat-insulating cover, it will be possible for the hook portions to undergo elastic deformation as they are being engaged with the detaining slot of the stopper member, thus facilitating the assembly operation.

In particular, positioning of the center hook portions over the strike plate portion is accomplished by placing the center hook portions within the stepped portions disposed in either side wall of the detaining slot of the strike plate portion, and in this state positioning the two end faces of the center hook portion relative to the two end stepped faces of the stepped portion, at either side of the detaining slot in the lengthwise direction. Subsequently, through abutment of the two end faces of the center hook portion against the two end stepped faces of the stepped portion, relative displacement of the center hook portion with respect to the strike plate portion will be constrained in the lengthwise direction of the detaining slot, affording a positioning action. In association with positioning of the center hook portions, the outside hook portions of the rubber heat-insulating cover will also be positioned stably with respect to the leg portions of the stopper member which is being fastened. With this arrangement, positioning of the rubber heat-insulating cover on the vibration damping device main unit via the stopper member can be accomplished effectively with a simple structure, and detachment of the rubber heat-insulating cover from the stopper member due to shifting out of position can be prevented.

Additionally, it is not necessary for the two end faces of the center hook portion to be maintained in a state of abutment against the two end stepped faces of the stepped portion at all times with the rubber heat-insulating cover installed on the stopper member. It would also be acceptable, for example, to make the length dimension of the center hook portion in the lengthwise direction of the detaining slot shorter than the length dimension of the stepped portion, and to position the center hook portion with one or both end faces thereof spaced apart by a prescribed distance from the two end stepped faces of the stepped portion. Thus, the end faces of the center hook portion come into abutment against the end stepped faces of the stepped portion inhibiting further displacement of the rubber heat-insulating cover relative to the stopper member only in instances where such displacement represents relative displacement by a prescribed distance in the lengthwise direction of the detaining slot. Naturally, the effect of positioning the rubber heat-insulating cover relative to the stopper member will be achieved with greater reliability where the components are assembled with both end faces of the center hook portion in constant abutment against the two end stepped faces of the stepped portion. In addition to reliably engaging or detaining the stopper member with the center hook portions and the outside hook portions composed of a rubber elastomer, by retaining the center hook portions their end faces abutting the stepped faces of the walls of the detaining slot, the rubber heat-insulating cover may be more effectively prevented from shifting out of position with respect to the vibration damping device main unit.

Consequently, in the vibration damping device equipped with the rubber heat-insulating cover having the structure of this invention, utilizing the stopper member, the rubber heat-insulating cover can be easily attached to the vibration damping device main unit without any increase in the number of parts so that improved production efficiency and lower cost may be advantageously achieved. Moreover, by retaining the rubber heat-insulating cover positioned reliably and stably with respect to the vibration damping device main unit, it will be possible to set and maintain the distance separating the rubber heat-insulating cover from the outside face of the main rubber elastic body with a high degree of accuracy so that the intended heat insulating action is advantageously achieved.

According to the present invention, preferably, the vibration damping device with the rubber heat-insulating cover employs a structure wherein the rubber heat-insulating cover has an inverted cup shape, an insertion slot is formed on the outside face of the rubber heat-insulating cover so as to extend from a bottom part to either peripheral wall part, the center hook portions are formed on walls in a center section of the insertion slot, while the outside hook portions are formed on walls at locations eccentric toward ends from the center section of the insertion slot, and the stopper member is fitted into the insertion slot. With this structure, the mating structure afforded by the insertion slot may be utilized for more stable support of the rubber heat-insulating cover on the stopper member, and higher accuracy of positioning.

Moreover, in the rubber heat-insulating cover-equipped vibration damping device according to the present invention, there may be employed a structure wherein each of the center hook portions and the outside hook portions includes a horizontal wall portion extending inward in a width direction from an upper edge of the insertion slot and a vertical wall portion extending towards a bottom of the insertion slot from an inside edge of the horizontal wall portion, and wherein an upper edge section of the detaining slot of the stopper member fits inside of the horizontal wall portion and the vertical wall portion so that the center hook portions and the outside hook portions are held in engagement with the two walls of the detaining slot. With this structure, the hook portions will be engaged with the walls of the detaining slot such that the hook portions are enrolled by the walls of the detaining slot, thereby advantageously affording a more stable detaining structure.

Furthermore, in the vibration damping device having the rubber heat-insulating cover according to the present invention, there may be employed a structure wherein the vertical wall portion is made thicker than the horizontal wall portion. With such a structure, the wall of the detaining slot can be clamped at a satisfactory level of force in the axis-perpendicular direction by the vertical wall portion, thus advantageously improving the stability of support of the rubber heat-insulating cover. Additionally, upward bending of the vertical wall portion during vulcanization molding of the rubber heat-insulating cover or during imposition of the hook portion against the wall of the detaining slot can be prevented. Meanwhile, since the horizontal wall portion is thinner than the vertical wall portion, good elastic deformation behavior on the part of the hook portions will be assured, and it will be possible to advantageously avoid greater difficulty in the operation of assembling the rubber heat-insulating cover to the stopper member owing to a thicker vertical wall portion.

Furthermore, in the rubber heat-insulating cover-equipped vibration damping device according to the present invention, there may be employed a structure wherein a distal edge section of the vertical wall portion has a tapering shape becoming thinner towards the bottom of the insertion slot. With such a structure, it is possible to reduce or prevent the distal edge section of the vertical wall portion from hitting the strike plate portion or basal end portions of the leg portions at the wall of the detaining slot of the stopper member, thus providing further improvement in ease of the assembly operation and stability in the assembled state.

Furthermore, in the rubber heat-insulating cover-equipped vibration damping device according to the present invention, there may be employed a structure wherein lightening holes are formed between the center hook portions and the outside hook portions of the rubber heat-insulating cover, while connecting sections between the strike plate portion and the leg portions of the stopper member are situated at the lightening holes. This structure obviates the need for the surfaces of the connecting sections to be juxtaposed against the outside peripheral faces between the center hook portions and the outside hook portions, thereby eliminating poor mating between the strike plate portion and the center hook portions or poor mating between the leg portions and the outside hook portions which may result where connecting section surfaces and the outside peripheral surfaces of the hook portions of mutually different shape are forcibly mated together. As a result, stability of assembly of the heat insulator to the stopper member may be improved. Also, the surfaces of the connecting sections need not be designed with especially high precision in order to fit precisely juxtaposed against the outside peripheral faces of the center hook portions and the outside hook portions, thereby affording an easier manufacturing process.

Furthermore, in the rubber heat-insulating cover-equipped vibration damping device according to the present invention, there may be employed a structure wherein a cushioning rubber is integrally formed in a section of the rubber heat-insulating cover which will be juxtaposed against the strike plate portion, and between opposing faces of the first mounting member and the strike plate portion. With such a structure, the first mounting member and the strike plate portion of the stopper member will strike one another via the cushioning rubber, thereby providing cushioned limitation of the amount of relative displacement of the first mounting member and the second mounting member. In particular, by integrally forming the cushioning rubber with the rubber heat-insulating cover, the labor entailed in attaching the cushioning rubber to a stopper member separate from the rubber heat-insulating cover can be eliminated, thereby affording advantages in terms of an easier assembly process and lower manufacturing cost.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
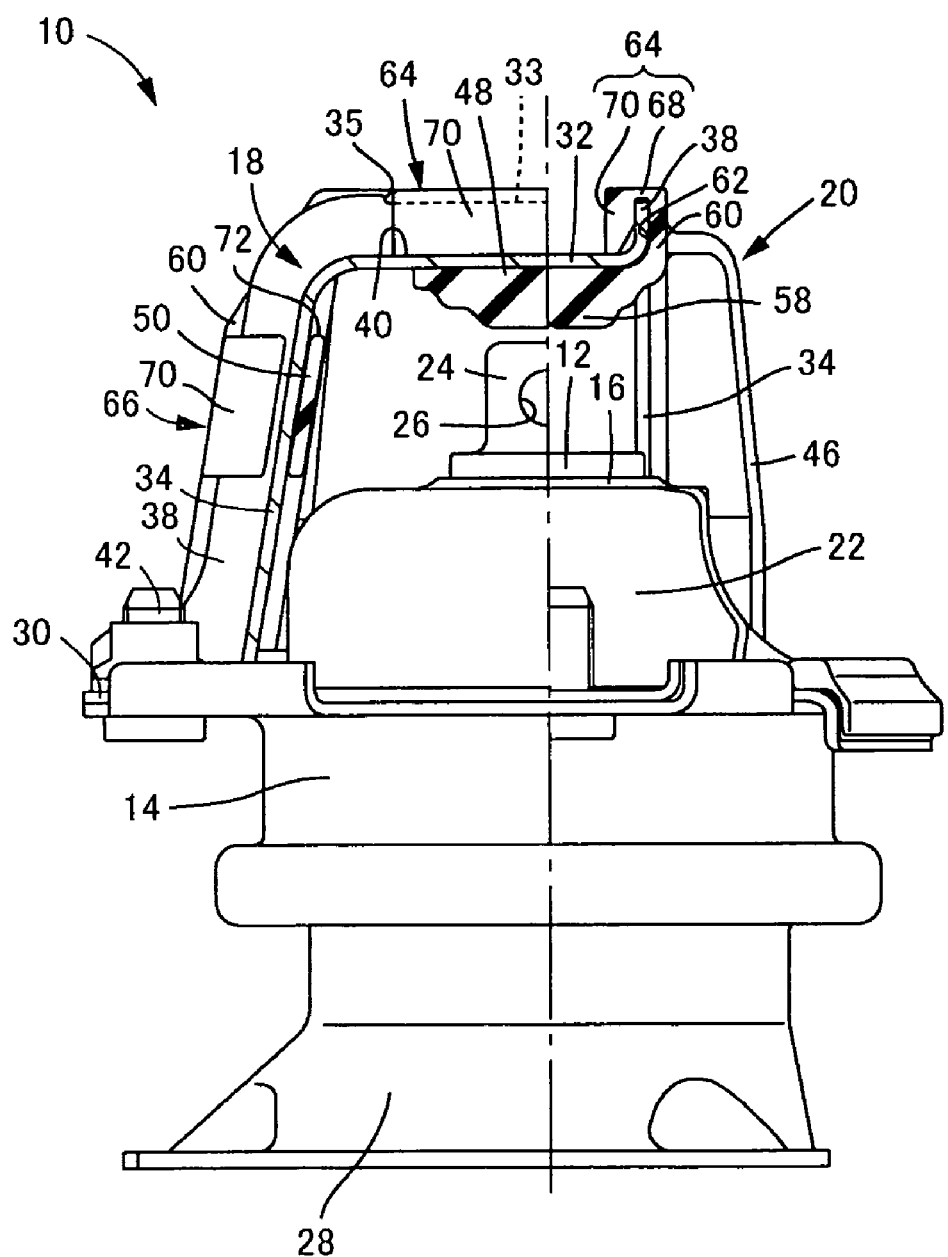
FIG. 1 is a view integrally showing a front elevation and a side elevation of a vibration damping device in the form of an automotive engine mount according to one embodiment of the present invention.

First, in FIG. 1 there is shown an automotive engine mount 10 as one embodiment of a rubber heat-insulating cover-equipped vibration damping device of the present invention. This engine mount 10 has a structure in which a first mounting member 12 of metal and a second mounting member 14 of metal are elastically connected via a main rubber elastic body 16; and a stopper member 18 of metal and a heat insulator 20 constituting the rubber heat-insulating cover are positioned with a space about the first mounting member 12 and the main rubber elastic body 16. This first mounting member 12 is mounted onto the power unit side, while the second mounting member 14 is mounted onto the vehicle body side to provide the power unit with vibration damping support on the vehicle body.

FIG. 1 depicts the engine mount 10 in isolation prior to installation in a vehicle. In the present embodiment, with the mount installed, the distributed support load of the power unit will be input in the axial direction of the mount (the vertical direction in FIG. 1). Consequently, with the mount in the installed state, the first mounting member 12 and the second mounting member 14 will undergo displacement towards one another in the axial direction due to elastic deformation of the main rubber elastic body 16. Also, in the installed state the vibration primarily targeted for damping will be input approximately in the axial direction of the mount. In the discussion following, unless indicated otherwise, the vertical direction shall refer to the axial direction of the mount, which is also the vertical direction in FIG. 1.

The engine mount 10 according to the embodiment is a vibration damping device of fluid filled type whose interior is filled with a non-compressible fluid. It employs a known structure such as that taught in JP-A-2005-172202, for example, and as such need not be discussed in detail herein. The first mounting member 12, which is of generally circular disk shape or circular cylindrical shape, is disposed spaced apart at a first opening (the upper opening in FIG. 1) of the second mounting member 14 of tubular shape, with a main rubber elastic body 16 of truncated conical shape disposed between the two members 12, 14. The outer peripheral face of the first mounting member 12 is bonded by vulcanization to the small-diameter end of the main rubber elastic body 16, while the inner peripheral face of the second mounting member 14 is bonded by vulcanization to the outside face at the large-diameter end of the main rubber elastic body 16 so that the first mounting member 12 and the second mounting member 14 are elastically linked, with one opening of the second mounting member 14 covered fluid-tightly by the main rubber elastic body 16. While not illustrated in the drawing, a cover member will be disposed over the other opening of the second mounting member 14 so that this opening is covered fluid-tightly by the cover member.

With this arrangement, the inside of the second mounting member 14 is closed by the main rubber elastic body 16 and the cover member, thereby defining a pressure-receiving chamber whose wall is partially constituted by the main rubber elastic body 16. The pressure-receiving chamber gives rise to fluctuations in pressure in response to elastic deformation of the main rubber elastic body 16. As taught in JP 2005-172202, the cover member is partially formed of a rubber film, so that it will be possible to adjust the pressure fluctuations within the pressure-receiving chamber through elastic deformation of the rubber film per se, or through forced excited displacement of the rubber film using an electromagnetic actuator or the like, to dynamically control the pressure fluctuations within the pressure-receiving chamber.

Furthermore, a readily elastically deformable diaphragm 22 is disposed as a flexible film so as to cover the outside of the main rubber elastic body 16, whereby an equilibrium chamber, which readily allows change in volume in response to elastic deformation of the diaphragm 22, is formed to the opposite side of the main rubber elastic body 16 from the pressure-receiving chamber. Specifically, the diaphragm 22 lies exposed to the outside of the mount unit. The pressure-receiving chamber and the equilibrium chamber are filled with a non-compressible fluid such as water, an alkylene glycol, a polyalkylene glycol, or the like. Between the pressure-receiving chamber and the equilibrium chamber is formed an orifice passage through which the chambers communicate with each other. The resonance frequency of the fluid induced to flow through the orifice passage will be tuned to that of the vibration being damped.

In particular, a mounting piece 24 is integrally formed in the upper end section of the first mounting member 12. A fastening bolt is passed through a through-hole 26 bored through the mounting piece 24 and is fastened by being screwed into a mounting member on the power unit side. A mounting bracket 28 of tubular contours is fastened to the opening on the other end (the lower end in FIG. 1) of the second mounting member 14, and this mounting bracket 28 is fastened to a mounting member on the vehicle body side with bolts or the like. With this arrangement, the engine mount 10 is installed in the vehicle so as to be interposed between the power unit and the vehicle body and provide vibration-damping support of the power unit on the vehicle body.

In this installed state, input of vibration across the first mounting member 12 and the second mounting member 14 will give rise to relative pressure fluctuations between the pressure-receiving chamber and the equilibrium chamber. This ensures a sufficient level of flow of fluid through the orifice passage, thereby affording vibration damping action based on the flow effects, such as the resonance effect, of the fluid.

A flanged portion 30 which flares outward in the axis-perpendicular direction is integrally formed at one end (the upper end in FIG. 1) of the second mounting member 14. The stopper member 18 is fastened to this flanged portion 30.

Figure 2:
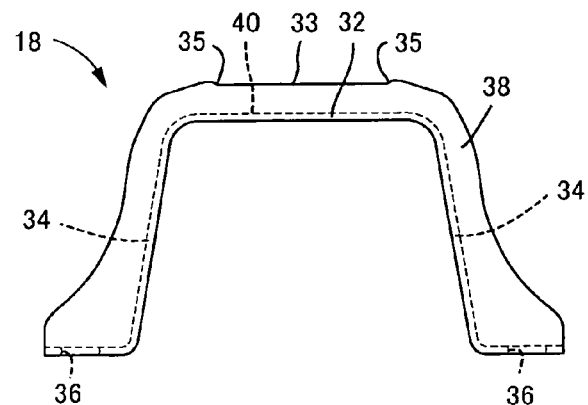
FIG. 2 is a front elevational view of a stopper member of the automotive engine mount of FIG. 1.
Figure 3:
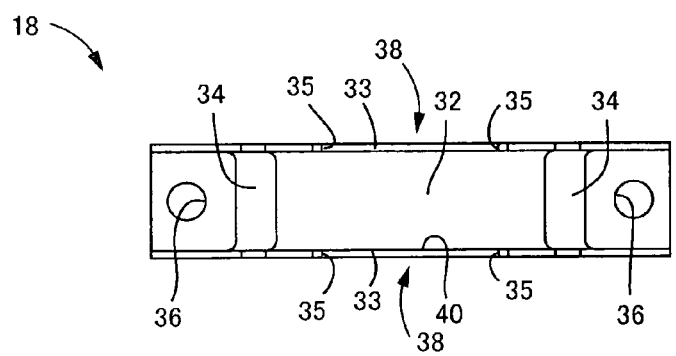
FIG. 3 is a top plane view of the stopper member of FIG. 2.
Figure 4:
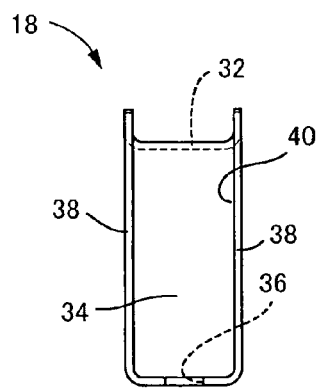
FIG. 4 is a side elevational view of the stopper member of FIG. 2.
Figure 5:
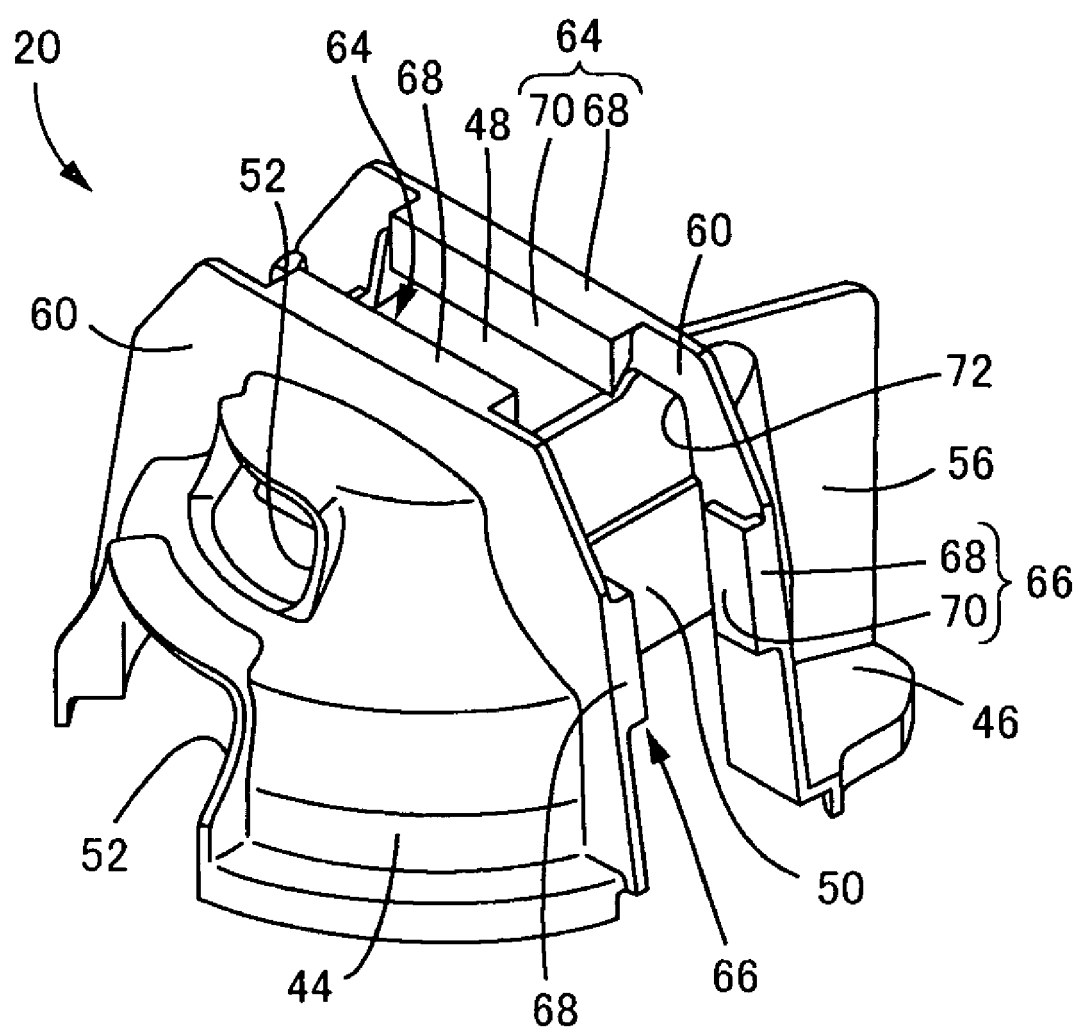
FIG. 5 is a perspective view of a heat insulator of the engine mount of FIG. 1.
Figure 6:
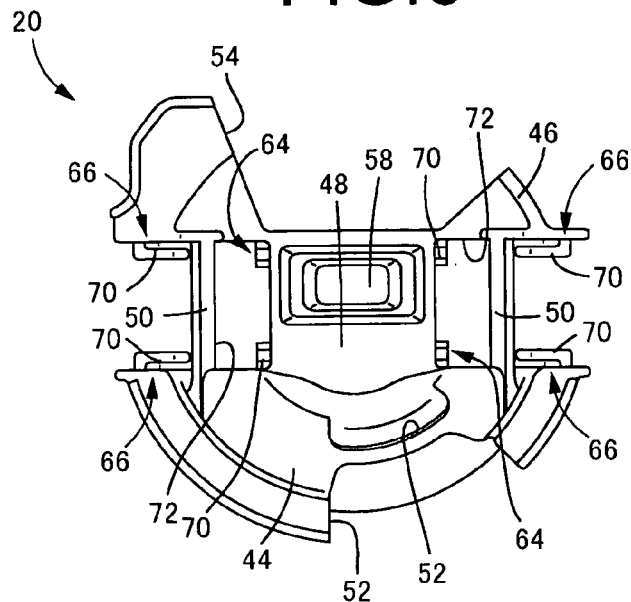
FIG. 6 is a bottom plane view of the heat insulator of FIG. 5.
Figure 7:
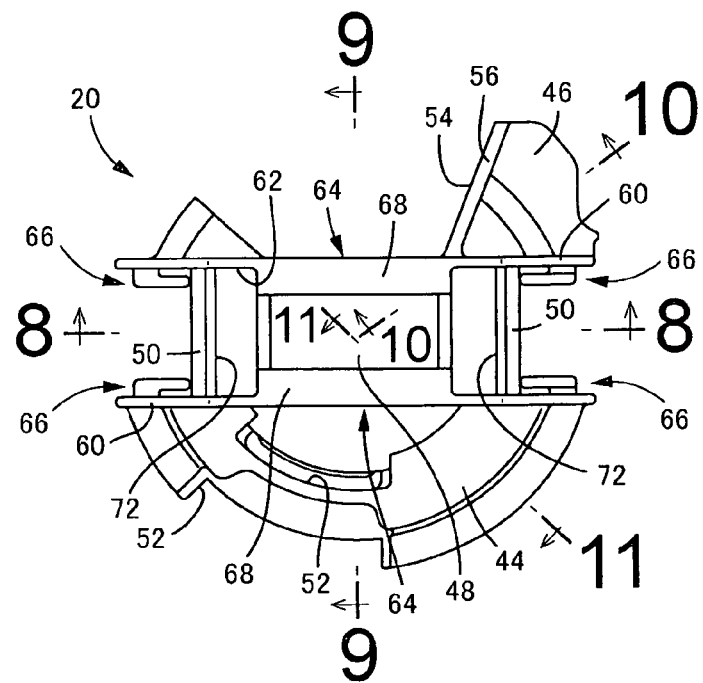
FIG. 7 is a top plane view of the heat insulator of FIG. 5.
Figure 8:
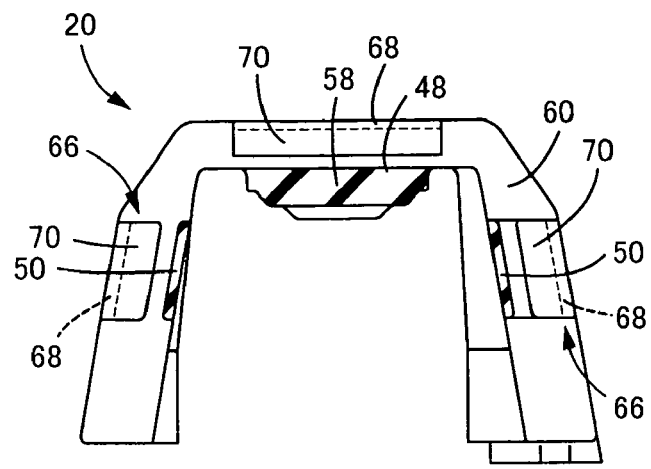
FIG. 8 is a cross sectional view taken along line 8-8 of FIG. 7.
Figure 9:
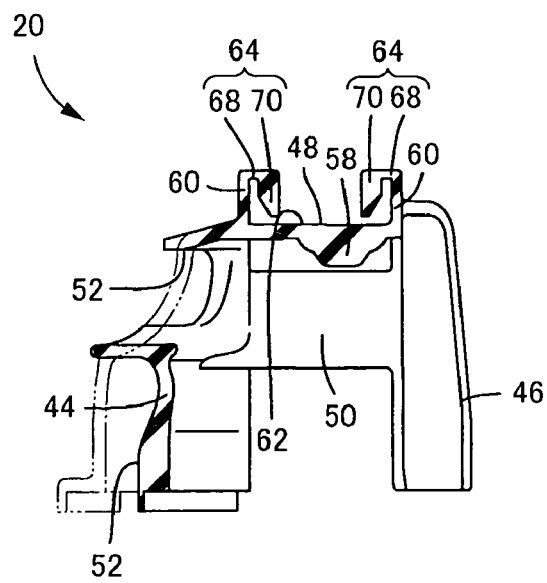
FIG. 9 is a cross sectional view taken along line 9-9 of FIG. 7.
Figure 10:
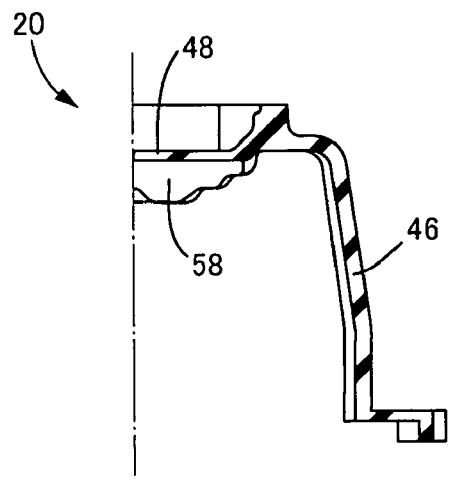
FIG. 10 is a cross sectional view taken along line 10-10 of FIG. 7.
Figure 11:
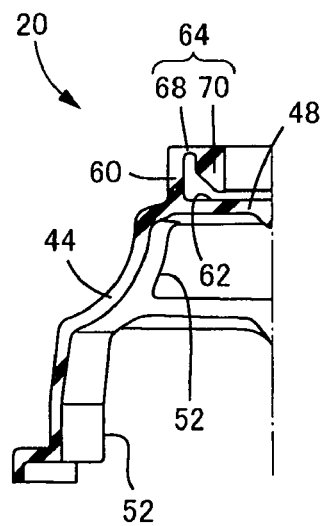
FIG. 11 is a cross sectional view taken along line 11-11 of FIG. 7.
Figure 12:
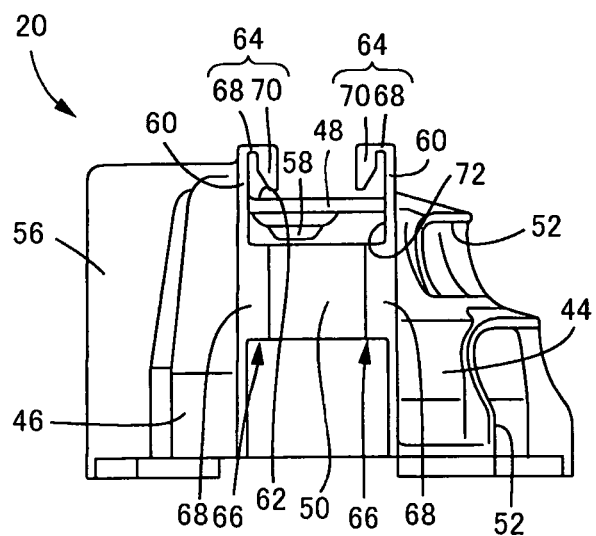
FIG. 12 is a side elevational view of the heat insulator of FIG. 5.
Figure 13:
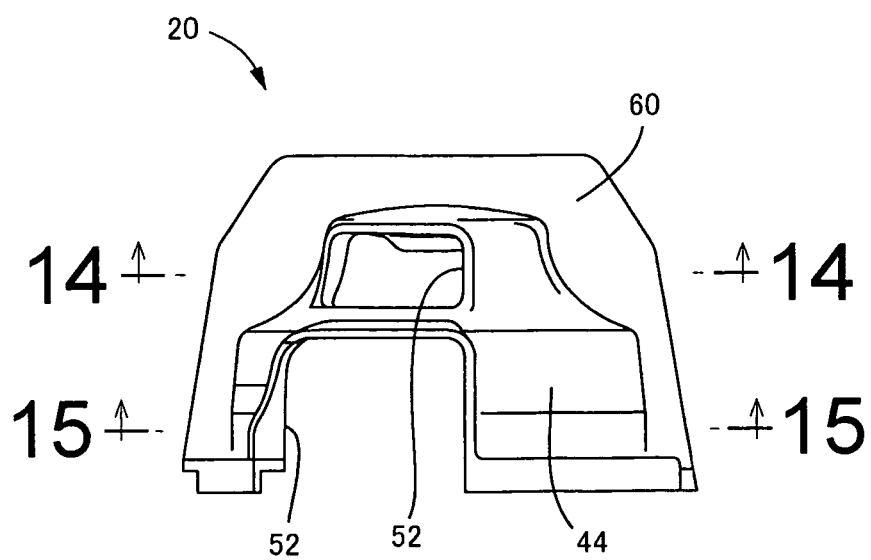
FIG. 13 is a front elevational view of the heat insulator of FIG. 5.
Figure 14:
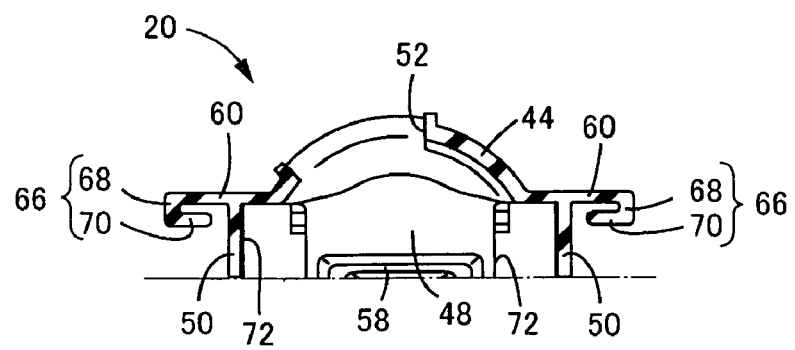
FIG. 14 is a cross sectional view taken along line 14-14 of FIG. 13.
Figure 15:
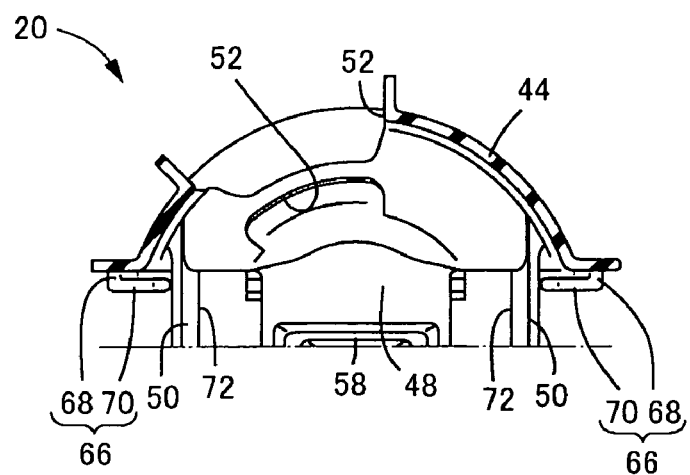
FIG. 15 is a cross sectional view taken along line 15-15 of FIG. 13.

Described in detail, as illustrated in FIGS. 2-4, the stopper member 18 includes a strike plate portion 32 of generally rectangular plate shape extending in the axis-perpendicular direction, as well as a pair of leg portions 34 of generally rectangular plate shape which extend downward from either end of the strike plate portion 32, giving the fitting an arched shape overall. The connecting regions between the strike plate portion 32 and the leg portions 34 where the upper ends of the leg portions 34 are integrally formed with the ends of the strike plate portion 32 are smoothly curving.

The lower ends of the leg portions 34 bend into rectangular plate shape extending approximately parallel to the strike plate portion 32, and their lower ends are perforated by through-holes 36. The distance separating the opposed faces of the pair of leg portions 34 will be greater than the outside dimensions of the diaphragm 22. The height dimension of the leg portions 34 will be sufficiently greater than the height dimension from the flanged portion 30 of the second mounting member 14 to the first mounting member 12 of the mount main unit.

Support panel portions 38 are integrally formed respectively along both edges of the stopper member 18 in the direction of its width (the vertical direction in FIG. 3 or the sideways direction in FIG. 4). The support panel portions 38 have flat plate shape extending upward from the widthwise edges of the stopper member 18 and extend with generally unchanging height along the entire widthwise edge. Specifically, in the stopper member 18, the pair of support panel portions 38, 38 positioned in opposition on the width direction, the strike plate portion 32, and the pair of leg portions 34, 34 together cooperate to define a detaining slot 40 of generally unchanging recessed cross section which opens to the outside of the stopper member 18 and which extends continuously through the pair of leg portions 34, 34 and the strike plate portion 32 situated between them.

In particular, a positioning channel 33 of notched shape serving as a stepped portion is formed at the center of the distal edge of each of the support panel portions 38 which rise up from either edge of the strike plate portion 32 in its width direction (the vertical in FIG. 3) and extend approximately parallel to the strike plate portion 32. The positioning channels 33 are formed by notching the distal edge of the support panel portion 38 to a prescribed depth dimension; the basal face of the positioning channel 33 will extend approximately parallel to the strike plate portion 32, with its ends in the lengthwise direction (sideways in FIGS. 2 and 3) situated above widthwise edge portions of the strike plate portion 32 at locations thereof located inward from the connecting sections with the leg portions 34. By forming such positioning channels 33 in the support panel portions 38, stepped faces 35, 35 which are defined by the lengthwise end faces of the positioning channel 33 will be formed on the distal edge face of the support panel portion 38. The stepped faces 35 are inclined upward from the basal face of the positioning channel 33, and outward in the lengthwise direction of the positioning channel 33.

With the first mounting member 12 and the diaphragm 22 of the mount main unit positioned slipped between the pair of leg portions 34, 34 of the stopper member 18 having the above structure, the lower ends of the leg portions 34 are juxtaposed against the flanged portion 30 of the second mounting member 14, and fastening bolts 42 which project from the flanged portion 30 are passed through the through-holes 36 in the leg portions 34 and fastened screwed thereon using fastening nuts. The stopper member 18 is thereby fastened onto the flanged portion 30 of the second mounting member 14, with the stopper member 18 positioned spaced apart outwardly from the first mounting member 12 and the diaphragm 22; and with the strike plate portion 32 of the stopper member 18 positioned in opposition to the upside of the first mounting member 12 and facing it across a gap of prescribed distance.

Meanwhile, as depicted in FIGS. 5-15, the heat insulator 20 is formed from rubber elastic material, and includes a first film portion 44, a second film portion 46, a center connector plate portion 48, and a pair of outside connector plate portions 50, 50, giving it an overall shape resembling an inverted cup open downward.

The first film portion 44 has hollow, generally quarter-spherical contours, and a plurality of window portions 52 formed at appropriate locations in the peripheral wall section.

The second film portion 46 has a pouch shape of smaller width dimension in comparison with the first film portion 44, and a large window portion 54 of cutout form situated in its center section. A radiator plate 56 of tabular form projects outward from the peripheral wall section of the second film portion 46.

This first film portion 44 and second film portion 46 are positioned in opposition spaced apart by a prescribed distance in the width direction (the vertical in FIGS. 6 and 7), with the center connector plate portion 48 and the pair of outside connector plate portions 50, 50 of generally rectangular plate shape disposed between their opposed faces, and with the widthwise ends of the connector plate portions 48, 50 are integrally formed with the inner peripheral edge portion of the first film portion 44 and the inner peripheral edge portion of the second film portion 46. Thus, the first film portion 44 and second film portion 46 are connected to each other through the center and outside connector plate portions 48, 50.

In the present embodiment in particular, the center connector plate portion 48 is situated at the center in the perpendicular direction (the sideways direction in FIGS. 6 and 7) to the direction of opposition of the first film portion 44 and second film portion 46, thereby constituting the center of the bottom part of the heat insulator 20. The outside connector plate portions 50 are positioned at locations spaced apart outwardly from the center connector plate portion 48 in the axis-perpendicular direction, thereby respectively constituting portions of the peripheral wall section of the heat insulator 20. The center connector plate portion 48 has a generally rectangular plate shape whose length dimension is smaller than the length dimension of the strike plate portion 32 of the stopper member 18, while the outside connector plate portions 50 have a generally rectangular plate shape whose length dimension is smaller than the length dimension of the center connector plate portion 48.

A stopper rubber 58 which projects downward is integrally formed on the center connector plate portion 48. This stopper rubber 58, which constitutes a cushioning rubber, is composed of several tabular portions of rectangular plate shape stacked in the axial direction with their outside dimension becoming gradually smaller towards the distal end in the direction of projection. The stopper rubber 58 is positioned eccentrically towards the second film portion 46 to one side in the width direction (upward in FIG. 6) on the bottom center of the heat insulator 20.

At the inner peripheral edges of the first film portion 44 and the second film portion 46 in the heat insulator 20, there are formed plate-shaped mating plate portions 60 which project outward with generally unchanging height dimension throughout. This pair of mating plate portions 60, 60 are positioned in opposition spaced apart by a prescribed distance in the direction of opposition of the first film portion 44 and the second film portion 46. Thus, in the heat insulator 20, the pair of mating plate portions 60, 60, and the center connector plate portion 48 as well as the pair of outside connector plate portions 50, 50 which extend between the pair of mating plate portions 60, 60, cooperate to define an insertion slot 62 which opens to the outside of the heat insulator 20 and which extends continuously with generally unchanging recessed cross section through zones reaching from the center section to the peripheral wall section to either side. As will be understood from the above description, the pair of mating plate portions 60, 60 are connected to one another by the center connector plate portion 48 and the pair of outside connector plate portions 50, 50. The width and length dimensions of the insertion slot 62 will be slightly larger than the width and length dimensions of the stopper member 18 which includes the pair of support panel portions 38, 38.

In each mating plate portion 60, a center hook portion 64 is provided in the section thereof connecting with the center connector plate portion 48, and outside hook portions 66 are provided in the sections of thereof connecting with the outside connector plate portions 50. In other words, a pair of the center hook portions 64, 64 will be positioned in opposition spaced apart in the width direction of the center connector plate portion 48, in the center of the bottom part of the heat insulator 20. Additionally, pairs of the outside hook portions 66, 66 will be positioned in opposition spaced apart in the width direction of the outside connector plate portions 50 in a peripheral wall section of the heat insulator 20, and positioned in opposition to either side of the center of the heat insulator 20 along an axis lying in the axis-perpendicular direction.

The center hook portions 64 and the outside hook portions 66 are each composed of a horizontal wall portion 68 of rectangular plate shape extending inward in the width direction from the upper edge of the mating plate portion 60, and a vertical wall portion 70 of rectangular plate shape extending downward or inward from the inside edge of the horizontal wall portion 68. The length dimensions of the center hook portions 64 and the outside hook portions 66 will be approximately equal in size to the length dimensions of the center connector plate portion 48 and the outside connector plate portions 50, so that the length dimension of the center hook portions 64 is larger than the length dimension of the outside hook portions 66.

In the present embodiment in particular, in the center hook portions 64, the thickness dimension of the horizontal wall portion 68 will be identical to or slightly smaller than the thickness dimension of the mating plate portions 60, whereas the thickness dimension of the vertical wall portion 70 will be sufficiently larger than the thickness dimension of the mating plate portions 60. Thus, the thickness dimension of the vertical wall portion 70 of the center hook portions 64 is sufficiently larger than the thickness dimension of the horizontal wall portion 68. On the other hand, the thickness dimension of the horizontal wall portion 68 and the thickness dimension of the vertical wall portion 70 of the outside hook portions 66 will both be approximately the same as the thickness dimension of the mating plate portions 60.

Furthermore, the vertical wall portion 70 of the center hook portion 64 is situated in opposition to and spaced apart in the width direction from the mating plate portion 60 by a distance equal to the width dimension of horizontal wall portion 68, and extends parallel to the mating plate portion 60. The height dimension of the vertical wall portion 70 is of size such that its projecting distal edge section which extends towards the respective connector plate portion 48, 50 from the inside edge of the horizontal wall portion 68 situated at the same height as the upper edge section of the mating plate portion 60 does not come into contact against the connector plate portion 48, 50. In the present embodiment in particular, the vertical wall portion 70 on the side thereof situated in opposition to the mating plate portion 60 has an inside edge of tapered contour of decreasing width dimension going from its axial medial section towards its projecting distal end section. The dimension of the center hook portions 64 in the lengthwise direction (sideways in FIGS. 7 and 8) is slightly smaller than the dimension in the lengthwise direction (sideways in FIGS. 2 and 3) of the positioning channel 33 formed in the support panel portions 38 of the stopper member 18, in other words, slightly smaller than the distance separating the pair of stepped faces 35, 35.

As will be apparent from the preceding description, in the heat insulator 20, the center connector plate portion 48 with the integrally formed center hook portions 64 and the outside connector plate portions 50 with the integrally formed outside hook portions 66 are disposed spaced apart in the direction perpendicular to the width direction (i.e. the lengthwise direction) of the connector plate portions 48, 50. Thus, the center hook portion 64 and the respective outside hook portions 66 formed on each mating plate portion 60 are positioned in opposition spaced apart by prescribed distances in the lengthwise direction. Additionally, lightening holes 72 of rectangular shape are formed between the center hook portion 64 and the respective outside hook portions 66, at locations between the center connector plate portion 48 and the respective outside connector plate portions 50.

To the mount main unit to which the stopper member 18 has been fastened, the heat insulator 20 having the above structure is now attached through insertion between the inside of the arch-shaped stopper member 18 and the first mounting member 12 and the diaphragm 22, and the stopper member 18 is inserted within the insertion slot 62. The strike plate portion 32 of the stopper member 18 is juxtaposed against the center connector plate portion 48 of the heat insulator 20, and each medial section of the leg portions 34 of the stopper member 18 is juxtaposed against the each outside connector plate portion 50 of the heat insulator 20.

Furthermore, the center hook portions 64 and the outside hook portions 66 of the heat insulator 20 undergo elastic deformation expanding the distance between the mating plate portion 60 and the respective vertical wall portions 70 of the hook portions 64, 66, whereupon the vertical wall portion 70 passes the support panel portion 38 of the stopper member 18 from the outside in the width direction or from the outside in the axial direction, and becomes positioned within the detaining slot 40 situated to the inside of the support panel portion 38. Additionally, the support panel portions 38 projecting from the strike plate portion 32 of the stopper member 18 slip between the mating plate portion 60 and the vertical wall portion 70 of the center hook portions 64, with the upper edge portion of the support panel portion 38 becoming positioned in opposition to the horizontal wall portion 68. Additionally, the support panel portions 38 projecting from the leg portions 34 of the stopper member 18 slip between the mating plate portion 60 and the vertical wall portion 70 of the outside hook portions 66, with the upper edge portion of the support panel portion 38 becoming positioned in opposition to the horizontal wall portion 68. It is not particularly critical whether the horizontal wall portion 68 of the hook portions 64, 66 and the upper edge portion of the support panel portion 38 are in abutment or spaced apart. The connector plate portions 48, 50 of the heat insulator 20 are juxtaposed against the stopper member 18, and the support panel portions 38 are clasped between the vertical wall portion 70 of the hook portions 64, 66 and the mating plate portion 60, whereby the heat insulator 20 is supported securely on the stopper member 18.

The center hook portions 64 fit mated within the positioning channels 33 of the support panel portions 38, and the horizontal wall portion 68 of the center hook portions 64 is positioned in opposition to, and either abutting or spaced apart from, the basal face of the positioning channel 33, while the lengthwise end faces of the center hook portions 64 are positioned in respective opposition to the stepped faces 35 of the stopper member 18. By making the lengthwise dimension of the center hook portions 64 slightly smaller than the distance separating the pair of stepped faces 35, 35, when the center section of the center hook portion 64 is positioned in the center between the opposed faces of the pair of stepped faces 35, 35, while strictly speaking there is separation between the end faces of the center hook portion 64 and the stepped faces 35, the distance separating these end faces and the stepped faces 35 is small enough to be ignored, and the end faces of the center hook portion 64 can be considered to essentially abut the stepped faces 35.

The automotive engine mount 10 according to the present embodiment is not limited to that depicted by way of example herein. For example, the lengthwise dimension of the center hook portions 64 could instead be larger than the distance separating the pair of stepped faces 35, 35 so that when the center hook portion 64 is fitted into the positioning channel 33, the center hook portion 64 will undergo compressive deformation, while the end faces of the center hook portion 64 come into abutment against the stepped faces 35.

With this arrangement, deformation of the center hook portion 64 in its lengthwise direction with respect to the support panel portions 38 of the stopper member 18 will be restricted, and the center section of the heat insulator 20 will be positioned on the strike plate portion 32 in the center section of the stopper member 18, securely supported thereon with the support panel portions 38 clasped by the center hook portions 64. In association with this positioning of the center section of the heat insulator 20, the peripheral wall sections of the heat insulator 20 will be positioned against the pair of leg portions 34 situated to the outside peripheral side of the stopper member 18, securely supported thereon with the support panel portions 38 clasped by the outside hook portions 66. As a result, the heat insulator 20 will be retained while positioned spaced apart by a prescribed distance to the outside of the first mounting member 12 and the diaphragm 22 and while positioned so as to cover the first mounting member 12 and the diaphragm 22 and secured to the mount main unit via the stopper member 18.

In this secured state, due to the fact that the center connector plate portion 48 of the heat insulator 20 is juxtaposed against the strike plate portion 32 of the stopper member 18, the stopper rubber 58 which projects from the center connector plate portion 48 will be positioned between axially opposed faces of the strike plate portion 32 and the first mounting member 12, and will project towards the first mounting member 12 from the stopper member 18 side. Furthermore, in the present embodiment in particular, the connecting sections of the leg portions 34 with the strike plate portion 32 of the stopper member 18 are situated at the lightening holes 72 of the heat insulator 20.

Assembly of the heat insulator 20 onto the mount main unit may also be accomplished by fastening it to the mount main unit to which the stopper member 18 has been previously fastened. Alternatively, the heat insulator 20 may be fastened to the stopper member 18 prior to being fastened to the mount main unit, and the stopper member 18 then fastened to the mount main unit.

In the automotive engine mount 10 equipped with the heat insulator 20 having the above structure, if a large load is input in the rebound direction across the first mounting member 12 and the second mounting member 14 inducing appreciable displacement of either of the two members 12, 14 away from the other, the first mounting member 12 and the strike plate portion 32 of the stopper member 18 will strike each other via the stopper rubber 58 which has been integrally formed with the heat insulator 20, thereby providing cushion-wise limitation of displacement of the members 12, 14 in the rebound direction. As a result, excessive deformation of the main rubber elastic body 16 will be prevented, and durability will be improved. Moreover, as will be apparent from the preceding description, the rebound stopper mechanism of the first mounting member 12 and the second mounting member 14 according to the present embodiment is constituted to include the stopper member 18 and the stopper rubber 58.

This kind of automotive engine mount 10 will be positioned at a location where it tends to be exposed to radiant heat from the engine, but since the outside faces of the first mounting member 12 and the diaphragm 22 are spacedly covered by the heat insulator 20, as a matter of course the main rubber elastic body 16 situated in the interior of the mount main unit, as well as the diaphragm 22, will be well protected by the heat insulator 20 thereby advantageously affording improved durability of the diaphragm 22 and the main rubber elastic body 16.

The heat insulator 20 is supported by the stopper member 18, which has a prescribed surface area and is made of a rigid element, utilizing the center hook portions 64 and outside hook portions 66. Accordingly, the heat insulator 20 will be supported on the mount main unit with stability. This arrangement prevents excessive abutment of the heat insulator 20 against the diaphragm 22 or other parts, thereby advantageously eliminating troubles caused by the abutment.

In particular, because positioning of the heat insulator 20 on the stopper member 18, and hence on the mount main unit, is accomplished through abutment of the end faces of the center hook portions 64 against the stepped faces 35 of the support panel portions 38, the positioning structure is a simple one. Moreover, the end faces of the center hook portions 64 and the stepped faces 35 of the support panel portions 38 will be maintained in the abutting state with the unit installed in an automobile, thereby preventing the heat insulator 20 from shifting out of place with respect to the mount main unit.

Furthermore, since the center hook portions 64 and the outside hook portions 66 integrally formed with the heat insulator 20 are used to fasten it to the stopper member 18, the fastening structure is simpler than one employing bolts or the like for fastening, and therefore the problem of a more complicated overall structure inclusive of the positioning structure discussed above can be advantageously eliminated.

Moreover, because both the center section and the peripheral section of the heat insulator 20 are supported on the stopper member 18, easy attachment operation can be afforded. In addition, it will be possible for example to avoid stress concentrations from occurring in the heat insulator 20 due to relative displacement of the first mounting member 12 and the second mounting member 14, such as can occur where the center section of the heat insulator 20 is supported on the first mounting member 12 side while the peripheral section of the heat insulator 20 is supported on the second mounting member 14 side. As a result it will be possible to improve durability of the heat insulator 20.

Additionally, since the heat insulator 20 is fabricated as a separate component from the stopper member 18, design modifications can be made to the shape, size, and other aspects of the heat insulator 20, without being appreciably limited by the aspects of the stopper member 18. Thus, sufficient freedom in design of the heat insulator 20 and the stopper member 18 can be afforded.

Therefore, in addition to achieving advantages in terms of improved production efficiency and lower cost, it can be realized surely to make design modifications to the heat insulator 20 as well as to maintain the heat insulator 20 in the separated state from the mount unit. Accordingly, the desired heat insulating action will be stably afforded.

In the present embodiment in particular, the stopper rubber 58 is integrally formed with the heat insulator 20, thereby avoiding an increase in the number of parts, providing still easier attachment operation.

Moreover, in the present embodiment, the mating plate portions 60 of the heat insulator 20 and the support panel portions 38 of the stopper member 18 respectively extend continuously from one peripheral edge portion (end portion) through the center section and on to the other peripheral edge portion (end portion), with the support panel portions 38 and the mating plate portions 60 juxtaposed in the width direction along their entirety. Therefore, the heat insulator 20 will be supported on the stopper member 18 with more stability.

While the present invention has been described in detail hereinabove through certain preferred embodiments, these are merely illustrative and the present invention should not be construed as limited in any way to the specific disclosure of the embodiments herein. Various modifications, alterations, and improvements thereto will be apparent to the practitioner of the art, and embodiments incorporating the same shall naturally be considered to fall within the scope of the present invention insofar as they do not depart from the spirit thereof.

For example, the shape, size, structure, number, placement, and other aspects of the stopper member 18, the heat insulator 20, the mount main unit and so on are not limited to those taught herein by way of example. In the following description, components and regions substantially identical in structure to the preceding embodiment are assigned identical symbols in the drawings and are not discussed in any detail.

Figure 16:
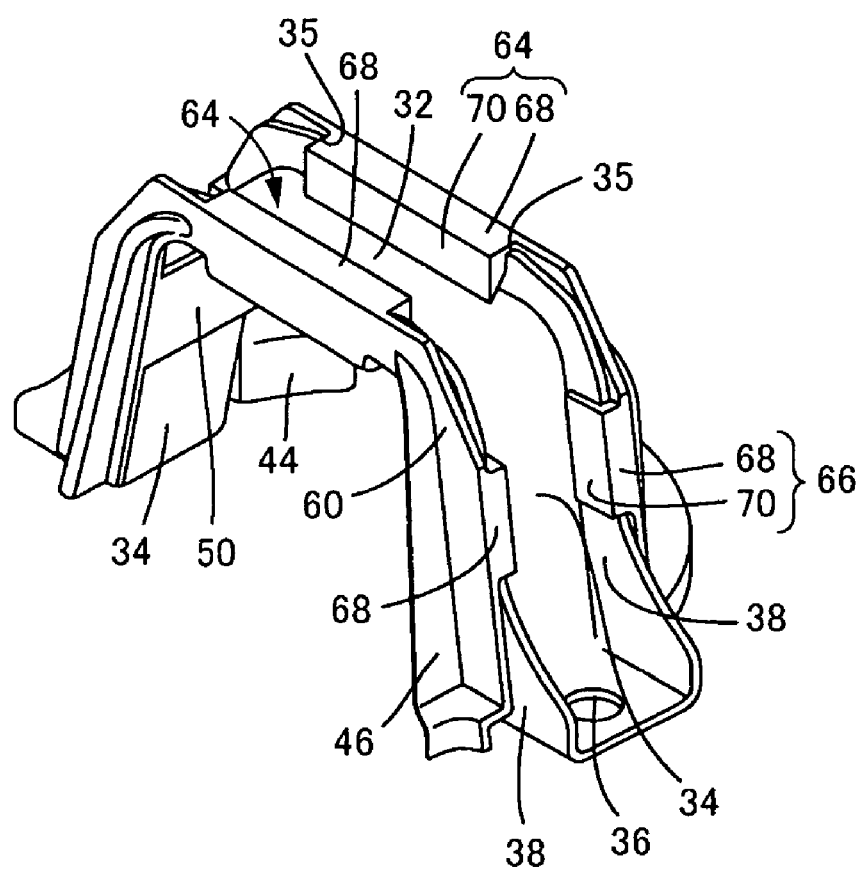
FIG. 16 is a perspective view of a heat insulator and a stopper member assembled together of an automotive engine mount according to another embodiment of the present invention.
Figure 17:
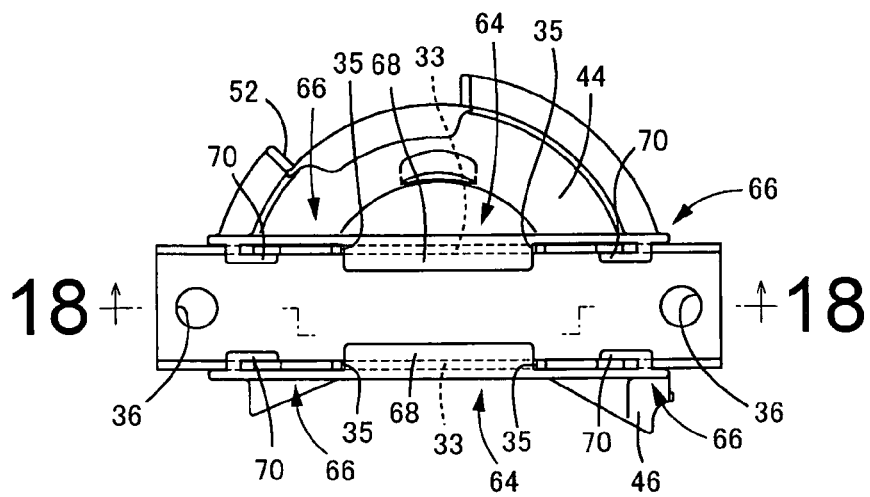
FIG. 17 is a front elevational view of the heat insulator and the stopper member assembled together as shown in FIG. 16.
Figure 18:
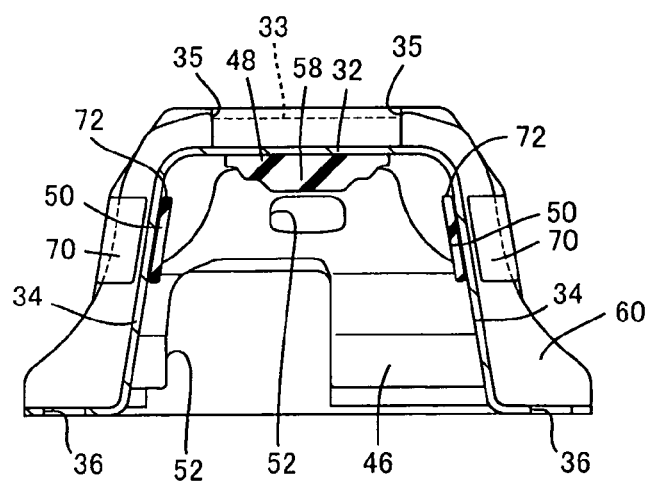
FIG. 18 is a cross sectional view taken along line 18-18 of FIG. 17.

Namely, whereas in the preceding embodiment the heat insulator 20 includes a first film portion 44 and second film portion 46 pair of pouch shape, depending on considerations such as the required heat insulating action and manufacturability, the second film portion 46 may have flat contours so as to be juxtaposable along mating plate portion 60 of the stopper member 18, as shown for example in FIGS. 16 through 18.

Also, whereas in the preceding embodiment the peripheral wall section of the heat insulator 20 is fastened to the leg portions 34, 34 of the stopper member 18 through the agency of the pair of outside hook portions 66, 66, it would be possible to fasten to only one of the leg portions 34 using one of the outside hook portions 66.

Furthermore, the stopper rubber 58 is not necessarily formed integrally with the heat insulator 20. For example, it is possible to eliminate the stopper rubber 58 to have the first mounting member 12 and the strike plate portion 32 of the stopper member 18 strike against each other via the center connector plate portion 48 of the heat insulator 20. Alternatively, it is possible to provide a stopper rubber projecting from a basal face of the strike plate portion 32 of the stopper member 18 so that the stopper rubber comes to be juxtaposed against the center connector plate portion 48 of the heat insulator 20, or so that the stopper rubber comes to be inserted into a hole bored through the center connector plate portion 48.

Moreover, whereas in the preceding embodiment, stepped faces 35 of the support panel portions 38 are defined by the lengthwise end faces of positioning channels 33 of notched shape being formed in the distal edge section of the support panel portions 38, the stepped faces 35 may alternatively be defined by end faces of projecting portion formed in the distal edge section of the support panel portions 38, for example.

Additionally, it is not essential to provide the stepped faces 35 in pairs respectively on each support panel portion 38. The pair of stepped faces 35, 35 may be replaced by one stepped face 35 on each support panel portions 38. In this case, these stepped faces 35 are positioned on opposite sides of the center of the strike plate portion 32 in mutually different direction so that one stepped face 35 abuts against one end face of one center hook portion 64 in the lengthwise direction while the other stepped face 35 abuts against the other end face of the other center hook portion 64 in the lengthwise direction. With this arrangement, the stepped face 35 of one support panel portion 38 and the stepped face 35 of the other support panel portion 38 may cooperate to limit displacement of the center section of the heat insulator 20, thereby positioning the center section of the heat insulator 20 on the strike plate portion 32 of the stopper member 18.

Furthermore, whereas the preceding embodiment describes implementing the present invention in a liquid system engine mount 10 having an internal pressure-receiving chamber, equilibrium chamber, and orifice passage, and filled inside with a noncompressible fluid, the invention is not limited thereto and could of course be implemented analogously, for example, in a solid system vibration damping device in which a first mounting member and a second mounting member are simply linked by a main rubber elastic body.

Additionally, whereas the preceding embodiment describes implementing the present invention in an automotive engine mount by way of specific example, it would be possible to implement the invention analogously in various other kinds of vibration damping devices that require installation of a stopper mechanism and a heat insulator.

What is claimed is:

1. A vibration damping device comprising:
   a first mounting member fixable to one of components connected together in a vibration damping fashion;
   a second mounting member fixable to an other of the components;
   a main rubber elastic body elastically connecting the first and second mounting members;
   a stopper member of arched shape which includes a pair of leg portions at either end of a strike plate portion extending in an axis-perpendicular direction, the stopper member being attached with lower ends of the pair of leg portions fastened to the second mounting member so as to project outward from the first mounting member in order to effect relative positioning of the strike plate portion and the first mounting member so that the strike plate portion and the first mounting member are brought into abutting contact with each other to provide a rebound stopper mechanism for limiting an amount of displacement of the first mounting member and the second mounting member in a direction of mutual separation; and
   a rubber heat-insulating cover for spacedly covering an outside face of the main rubber elastic body, disposed overlying the main rubber elastic body from a first mounting member side,
   wherein the strike plate portion and the pair of leg portions of the stopper member are formed with detaining slots respectively opening towards an outside, and two side walls of the detaining slot of the strike plate portion have stepped portions of notched shape disposed in a heightwise distal edge section thereof,
   wherein center hook portions are integrally formed on an outside face of a center section of the rubber heat-insulating cover, while outside hook portions are integrally formed on an outside face of a peripheral wall portion of the rubber heat-insulating cover, and
   wherein the center hook portions are held in engagement with the two side walls of the detaining slot of the strike plate portion, and the outside hook portions are held in engagement with the two side walls of the detaining slots of the pair of leg portions, while two end faces of the center hook portions are held in abutment against stepped faces at either end of the stepped portions provided in both side walls of the detaining slot of the strike plate portion, for thereby positioning the center section of the rubber heat-insulating cover in a lengthwise direction of the detaining slot of the strike plate portion of the stopper member, and fastening the rubber heat-insulating cover to the stopper member.

2. The vibration damping device according to claim 1, wherein lightening holes are formed between the center hook portions and the outside hook portions of the rubber heat-insulating cover, while connecting sections between the strike plate portion and the leg portions of the stopper member are situated at the lightening holes.

3. The vibration damping device according to claim 1, wherein a cushioning rubber is integrally formed in a section of the rubber heat-insulating cover which is juxtaposed against the strike plate portion, and between opposing faces of the first mounting member and the strike plate portion.

* * * * *